UNITED STATES PATENT OFFICE.

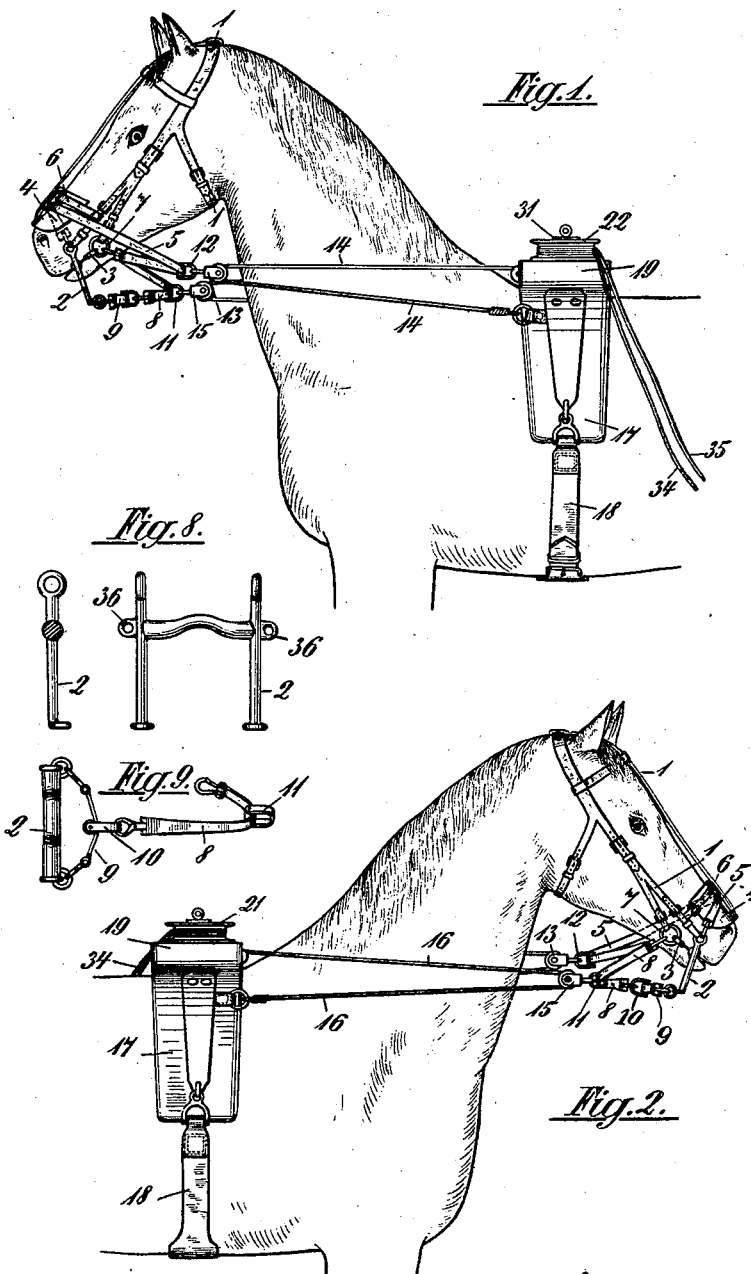

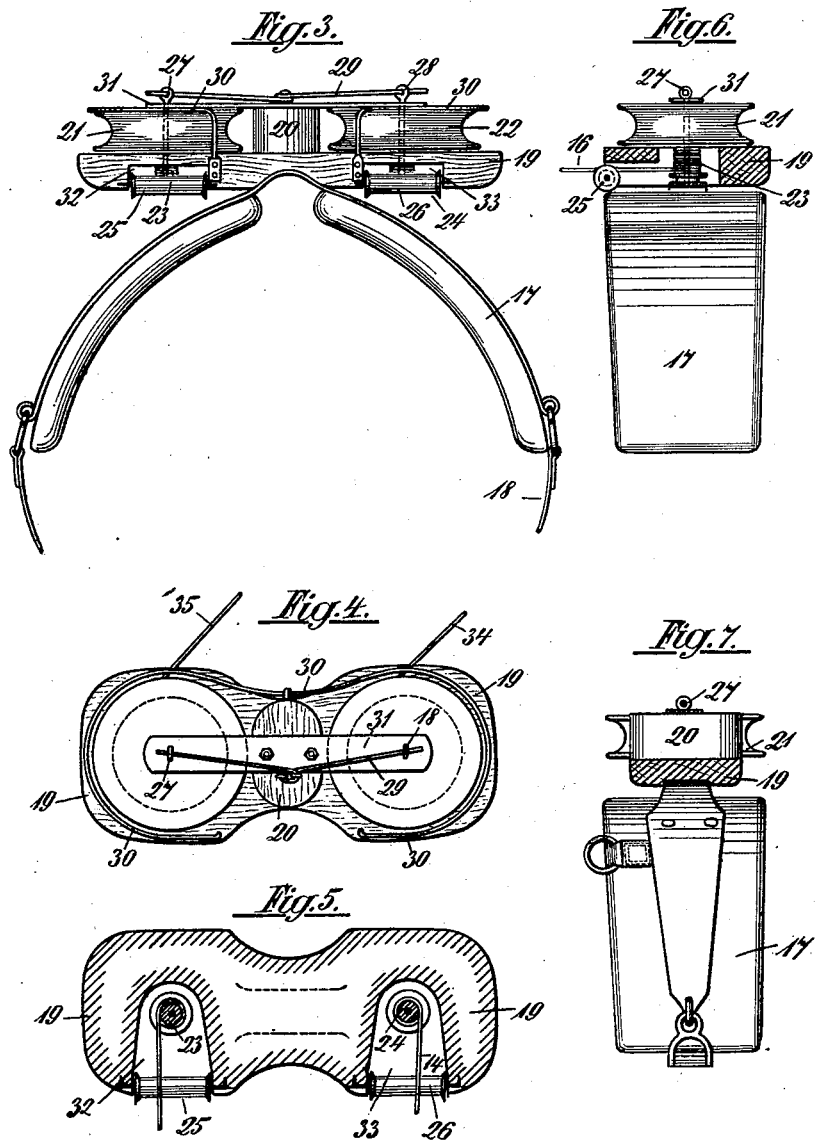

ALOIS GRAF, OF STUTTGART, GERMANY.

APPARATUS FOR TRAINING HORSES.

SPECIFICATION forming part of Letters Patent No. 710,267, dated September 30, 1902.

Application filed February 18, 1902. Serial No. 94,579. (No model.)

*To all whom it may concern:*

Be it known that I, ALOIS GRAF, a citizen of the German Empire, residing at Stuttgart, in the Kingdom of Würtemberg, Germany, have invented certain new and useful Improvements in Apparatus for Training Horses, of which the following is a description, reference being had to the accompanying drawings and to the figures of reference marked thereon.

The present invention relates to improvements in apparatus for training horses, by means of which the traction exerted upon the reins by the trainer is softened by a particular arrangement of the bridle and training reins.

The object of the present invention is illustrated in the accompanying drawings, in which—

Figures 1 and 2 are right and left hand side views of the apparatus applied to a horse to be trained, (from the near side, Fig. 1.) Fig. 3 is a front elevation of the saddle portion of the apparatus. Fig. 4 is a plan thereof; Fig. 5, a horizontal section thereof; Fig. 6, a transverse vertical section thereof through one pair of winding-rollers. Fig. 7 is an end elevation of the saddle, partly in section. Fig. 8 shows the bridle in elevation and vertical section; and Fig. 9 shows the bridle-bit in plan view, together with the devices for connecting it with one of the bridle-reins.

In the example illustrated the horse is intended to run to the left-hand side.

The saddle-like frame 17, fixed on the horse's back by a girth 18, is provided with a bridge 19, carrying on its right and left hand side rollers 21 and 22, rotatable around the pins 27 28, fixed in the transverse rod 31 and in the bridge 19. The transverse rod 31 is fixed upon the central block 20, carrying spring arms or pins 29, which pass through eyes in the upper ends of the pins 27 28 in order to hold them in position. The rollers 21 22 on their bottom sides are provided with small rollers 23 24 of about a quarter of the diameter of the rollers themselves. In order to allow of the arrangement of these smaller rollers, the bridge 19 has two recesses 32 33. The bridle-reins 16 and 14 are at one end wound around these smaller rollers and then fixed at their opposite end to the frame 47, as illustrated by Figs. 1 and 2. The training-reins 34 35 are wound around the rollers 21 22 and held from accidental displacement thereon by a wire frame 30, Fig. 4. The bridle-reins being fixed upon the frame 17, the other ends after being wound around the smaller rollers 23 and 24 underneath the rollers 21 22 are conducted over horizontal guide-rollers 25 26 and connected to the snaffle 3, or, more precisely, to the snaffle-ring 7 and to the bridle-bit 2, by means of the straps 5 and 8.

Suppose the horse runs in a circle to the left hand of the trainer. The left or inner rein 14, by a roller 13 and a ring 12, is connected to a strap 5, which at one end is attached to the inner snaffle-ring 7 and is guided over a head-plate 4, held on the front of the bridle by a nose-strap 6 and at the other outer side is fixed to the upper end of the curb or bridle bit 2, Fig. 1. The outer rein 16, by means of a roller 15 and ring 11, is attached to a strap 8, connected at one side by means of the roller 10 to the arm 9, which connects the lower ends of the side bars of the curb-bit 2, and at the other side with the outer ring 7 of the snaffle 3.

With wild horses the strap 5 is guided through the snaffle-ring and is fixed in the eyelets 36, forming the prolongation of the bridle-bit 2, Fig. 8. When now by exerting a traction on the training-rein 34 the bridle-rein 14 is attracted, the movement of the latter, owing to the arrangement of the rollers 21, 22, 23, and 24, is not half as heavy as would be the case when the traction is exerted directly upon the bridle-rein. Each pair of rollers 22 24 constitutes a differential pulley. If, for instance, the roller 22 is four times greater than the small roller 24, the movement of the rein 14 is only one-eighth of that of the training-reins 34. In the same manner the strap 8 will be moved by the bridle-rein 16 when the outer rein 35 is attracted. When now the horse shall run in the other direction, the right bridle-rein 16 is connected at the right-hand side to the snaffle and at the left-hand side to the upper end of the bridle-bit. In the same manner the rein 14 is connected to the strap 8, the latter being fixed to the left snaffle-ring.

It will be seen from the foregoing that the horse is guided on the near side by the snaffle only and at the off side by the bridle-bit and snaffle.

The movement of the snaffle-rein is so slight that the horse follows very willingly.

The apparatus can be used for training saddle and carriage horses.

Having now particularly described and ascertained my invention, I declare that what I claim is—

1. In a training apparatus for horses, the combination with a saddle-like frame carrying large and small winding-rollers for the bridle and training reins, a bridle-bit and snaffle connected to the bridle-reins by means of straps and rollers, substantially as and for the purpose as described.

2. In a training apparatus for horses, the combination with the driving and bridle reins of a frame 17 carrying a bridge 19 and winding-rollers 21, 22, small rollers 23, 24, arranged in same line as the large rollers, horizontal guide-rollers 25, 26, the whole for guiding the bridle and training reins, substantially and for the purpose as set forth.

3. In a training apparatus for horses the combination with bridle-reins 14, 16, snaffle 3, and bridle-bit 2, the bridle-reins being connected to the snaffle and bridle bit, and a connection 9 connecting the lower ends of the side arms of the bridle-bit, for the purpose substantially as described.

4. The combination with the bridle, its curb and snaffle bits and a saddle-like support, of a strap extending from the upper end of the curb-bit at one side around to the snaffle at the opposite side, a second strap extending from the lower end of the curb-bit around to the other side of the snaffle, and bridle-reins secured at one end to said support and in running connection between their ends with the said straps; substantially as described.

5. A training apparatus, comprising a bridle having curb and snaffle bits, a saddle-like support provided with a pair of differential winding-pulleys, a strap extending from the upper end of the curb-bit at the off side, around to the snaffle at the near side, a second strap extending from the lower end of the curb-bit around to the off side of the snaffle, bridle-reins extending from the smaller pulleys forward to a running connection with the said two straps and thence rearwardly to the said support to which they are fixed and driving-reins wound on the larger pulleys.

6. The combination with the bridle and a saddle-like support, provided with a pair of differential pulleys, of the bridle-reins wound at one end on the smaller pulleys and the driving-reins wound on the larger pulleys; substantially as described.

7. In a training apparatus, the combination with the bridle and driving reins of the saddle-like support, comprising a horizontal bar, a pair of vertically-disposed differential pulleys thereon for the driving and bridle reins, supporting-rods for the pulleys having eyes at their upper ends, and spring arms or pins secured to the middle of the bar with their outer ends passing through said eyes; substantially as described.

8. In a training apparatus, the combination with the bridle and driving reins of the saddle-like support, comprising the horizontal bar, the vertically-disposed pair of differential pulleys thereon for the bridle and driving reins, and a frame secured to the said bar and curved around the driving-rein pulleys to hold the reins from displacement; substantially as described.

9. In a training apparatus, the combination with the bridle and driving reins of the saddle-like frame having a horizontal bar provided with recesses at opposite sides of its middle, a pair of differential winding-pulleys mounted thereon for the driving and bridle reins, and guide-rollers in advance of the lower smaller winding-pulleys; substantially as described.

In testimony whereof I affix my signature in presence of two witnesses.

ALOIS GRAF.

Witnesses:
AUGUST DRAUTZ,
WALTER SCHMAETZEL.